July 5, 1932.　　　P. P. PIPES　　　1,865,723
RAIL BOND
Filed April 2, 1929　　2 Sheets-Sheet 2

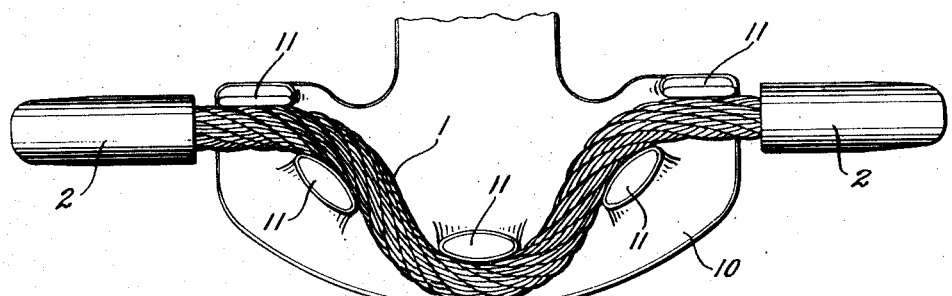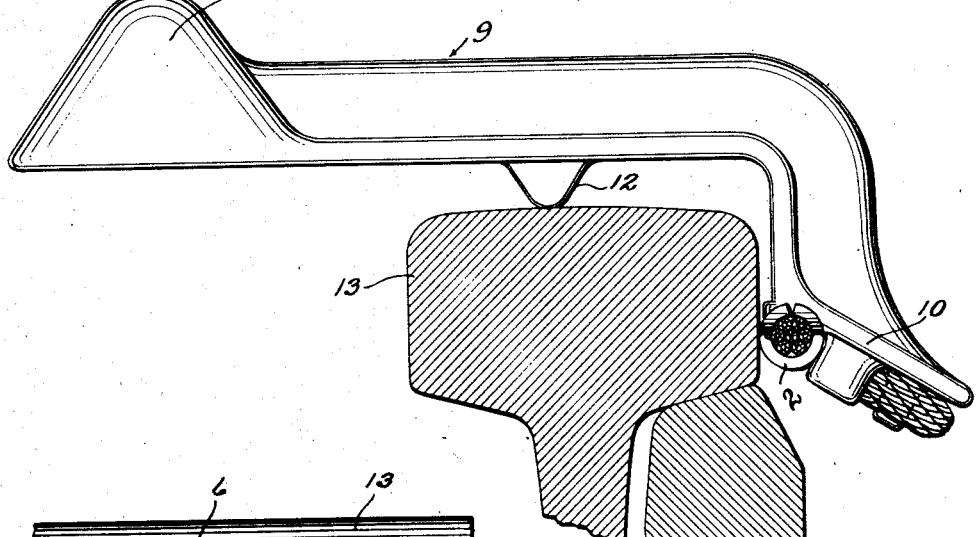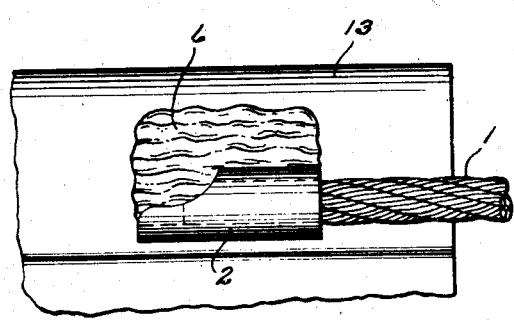

WITNESS:
H. J. Stromberger

Inventor
PLINY P. PIPES
By
Attorney

Patented July 5, 1932

1,865,723

UNITED STATES PATENT OFFICE

PLINY P. PIPES, OF MANSFIELD, OHIO, ASSIGNOR TO THE OHIO BRASS COMPANY, OF MANSFIELD, OHIO, A CORPORATION OF NEW JERSEY

RAIL BOND

Application filed April 2, 1929. Serial No. 351,883.

My invention relates to the art of bonding rails, that is, efficiently connecting two or more rails which are required to carry current, and has particular reference to steam roads where the service is very severe due largely to the great number of heavy cars passing a given point in a short time.

One of the objects of my invention is to produce a bond which can be efficiently and securely applied to rails; which will efficiently conduct the current from rail to rail; which will withstand the great number of relative movements of the rails and the vibration due to passing cars and which sets up repeated stresses in the bonds adjacent the terminals thereof and further produces a bond in which the repeated fatigue stresses set up in the bond body will be less than the endurance limit of the metal of which the bond body is composed.

Another object is to provide a method for manufacturing a bond having the above objects and other objects disclosed hereinafter.

Another object is to provide a mechanical and electrical joint comprising a pair of rails and a bond which has a greater endurance limit than the fatigue stress set up in the bond body as later explained and the method of producing the same.

In the drawings accompanying this specification:—

Fig. 1 is a view in elevation of one form of bond involving my invention.

Fig. 2 is an end view of Fig. 1.

Fig. 3 is a view of my bond secured to a forming and holding device prior to its application to a rail.

Fig. 4 is a side view of Fig. 3 with the bond and holding device in position upon the side surface of a rail prior to the welding operation securing the bond to the rail.

Fig. 5 is a side view of the rail and one bond terminal shown in Fig. 4 after the terminal has been welded to the rail.

Rail bonds consist of a body or cable member with a terminal secured to one or both ends of the cable and in the past have been made largely of copper wire. Such bonds have not been satisfactory as they do not possess the life desired, although highly efficient electrically and such material is not suited to meet the service requirements, especially upon steam roads where bonds are subjected to many movements during a single day and severe pounding and vibration due to the passing of cars from rail to rail.

I have given careful study and considerable experiment to the requirements involved and have devised a new and novel bond, method of manufacturing the same and an efficient rail joint, and especially have I given consideration to the fatigue stresses which appear to be set up in a rail bond, and have found that by meeting certain requirements, the life and efficiency of bonds may be materially increased and improved respectively.

The rail ends are not always held rigid by the plates, and passing cars move the rail ends relative to each other and the terminals of a bond rigidly secured to the rail ends will move relative to each other in a vertical direction, and such movement subjects the flexible portion between the terminals to cycles of increasing and decreasing vibration stresses and such stresses in time will cause the wires composing the body to fracture under certain conditions.

Repeated stress tests may be made on different materials and the results plotted, which will show the values of unit stress in the material as ordinates and the value of the corresponding number of cycles of stress necessary to fracture the material as abscissas. A given material may be subjected to a predetermined stress and if not exceeded, the number of cycles of movement which it will withstand without fracture are theoretically infinite.

Figure 16:
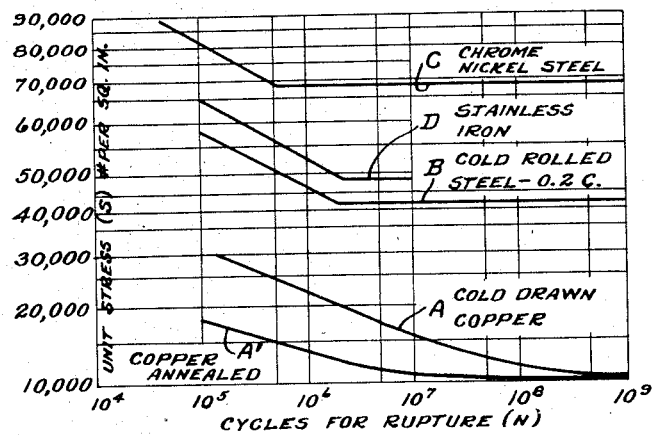
Fig. 16 is an S—N diagram representing the number of repeated stresses or cycles of stress to which materials shown thereby may be subjected and different endurance limits.

In Fig. 16 the curve A represents that of cold drawn copper, of which bond bodies are largely made today, and this curve shows that if the fiber stress in the cold drawn copper of the bond body is in excess of 10,000 to 11,000 lbs. per sq. inch, the endurance limit, the body will be ruptured under repeated movements or cycles of stress, and the number of movements to which the copper body may be subjected will decrease as the fiber stress in the body increases.

On account of the low value of the endurance limit of copper, it is well to allow a fairly large factor of safety, that is, the bond body of copper should be worked at a much lower fiber stress if it is to withstand indefinitely repeated cycles of stress or movements without rupturing the wires of the body. The breakage of bond bodies of copper in service would indicate that the fiber stress therein exceeded 10,000 to 11,000 lbs. per sq. in. If, for instance, the fiber stress in the body was about 15,000 lbs. per sq. in., then according to curve A, the body would begin to break at about 10,000,000 cycles of stress.

Curve B represents a cold drawn steel stock of about 0.20 carbon and shows that if the fiber stress is not greater than about 41,000 lbs. per sq. in., that the material will stand an indefinite number of stress cycles without breakage. Here again a factor of safety should be used.

It will be seen that if the material in the bond body is of the steel represented by curve B and is worked at about 22,000 lbs. per sq. in. fiber stress, it will stand indefinitely, and if of copper it would last only for 1,000,000 cycles of stress because the fiber stress in the bond body if of steel would be less than the endurance limit (41,000#), and if the bond body is of copper, the fiber stress should be greater than the endurance limit (10,000#).

Curve C shows a chrome-nickel steel containing carbon 0.24, chromium 0.87 and nickel 3.33. Here it will be seen that the maximum fiber stress to which a bond made of this material can be worked without breakage is about 69,000, lbs. per sq. in. the endurance limit, or 40,000 lbs. per sq. in. allowing a factor of safety.

It is my invention to use in the body of my improved bond which is subjected to repeated cycle stresses, a material having a greater endurance or fatigue limit than the fiber stress to which the material in the finished bonds will be subjected to in service, or at least the fatigue limit of the material should be not less than the fiber stress in the bond body.

It will be noted that the cold drawn steel has a greater endurance limit than copper, therefore it is a better material to use so far as the question of life is concerned, but the conductivity is lower. However, I find that under certain conditions, as bonding signal circuits and for track circuits where a high voltage is used on the trolley, a ferrous body bond is not objectionable, especially if the center core is of copper and the ends of the copper and steel portions of the body welded to the rails.

A cold rolled carbon steel has a greater endurance limit than the same steel annealed, also as the carbon content increases, the endurance limit is raised.

It will be observed that the alloy steel has a greater endurance limit than ordinary carbon steel. From the three curves it will be seen that it is possible to determine with a great degree of certainty whether a given material used in a bond body will give the life desired, by determining the S—N curve for that material and the method of determining the data for the S—N curve is by use of a rotary-beam machine, set forth fully in Bulletin 124 of the engineering station of the University of Illinois by Moore and Krammers. In such tests a turned specimen is rotated about a longitudinal axis with a known load applied adjacent its center to subject the specimen to a fiber stress and the number of revolutions required to rupture the specimen is noted with various known loads. This data is plotted to produce the S—N curves.

In making up a bond of my improved construction, I provide a body 1 with a ferrous or non-ferrous terminal 2 on one or both ends and fixedly secured thereto with or without an interposed sleeve 3. I prefer the terminal of ferrous metal and the sleeve of a non-ferrous metal. The terminal 2 may be stamped from a sheet to the desired shape and then formed to fit the body, after which it is secured to the body with a greater or less degree of pressure and with or without the sleeve 3 interposed. If sufficient compression is used, the wires of the body will be found to make impressions therein as I use a softer stock in the terminal as a rule than in the body and when the sleeve 3 is of copper or other non-ferrous materials, the copper tends to flow into the voids between the wires of the body.

The terminal is composed of the tubular portion 4, and the projecting portion 5 supports the fused attaching metal 6 in fused relation to the end face of the body, the terminal, the sleeve and the rail. The body projects beyond the end of the part 4. The terminal may be made of other shapes to meet requirements.

Figure 8:
Fig. 8 is one of the strands employed in producing the finished body shown in Fig. 6 and shows the preformed condition.
Figure 9:
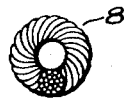
Fig. 9 is an end view of Fig. 8.
Figure 10:
Fig. 10 is another form of flexible body member which I may employ.
Figure 11:
Fig. 11 is an end view of Fig. 10.
Figure 12:
Fig. 12 is one of the individual wires of which the form in Fig. 10 is composed and shows the same preformed.
Figure 13:
Fig. 13 is an end view of Fig. 12.
Figure 14:
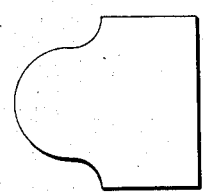
Fig. 14 is a view of the terminal member in Fig. 1, as it is stamped from sheet metal and before it is formed.
Figure 15:
Fig. 15 is a member shown in Fig. 14 preformed before application to the ends of the body member.

I may make the body entirely of steel or combined with copper to improve the conductivity or of two grades of steel. I prefer a body composed of a central strand 7 with six strands laid thereon in a spiral or helix of a relatively short pitch as shown in Fig. 8 and each strand is formed of a plurality of individual wires. If I use copper in the body to improve the conductivity, I prefer to employ it in the center strand or core and steel in the outer strands because the endurance limit of the copper is considerably lower than that of steel and the wires nearer the neutral axis of the body would be subjected to a less fiber stress than the wires further from the neutral axis.

Therefore, the metal which has the lower endurance limit is closer to the neutral axis and is subjected to the lower fiber stress and the outer strands of steel protect the copper core from external abuse.

Figure 6:
Fig. 6 is a longitudinal view of one form of body member which I employ.
Figure 7:
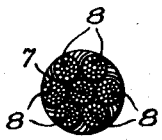
Fig. 7 is an end view of Fig. 6.

If the body shown in Fig. 6 had an outer layer of strands added thereto which would be subjected to a greater fiber stress, such layer could be made of material represented by curve C.

I also prefer to preform each strand and the wires therein (see Fig. 8) before assembling them about the strand core 7 as this equalizes and reduces stress in the body, particularly torsional, and prevents the outer strands "flaring" or unwinding when cut into lengths for the bonds. This latter feature has a decided manufacturing advantage and especially with a body composed of cold rolled material of high tensile strength and elasticity as such preforming makes it unnecessary to "band" or bind the ends of the cable prior to placing the terminals thereon. The preforming may be accomplished as by machines disclosed in United States Letters Patent #1,518,253.

The material from which the body is composed other than copper may be a soft iron if desired but such material has a relatively low endurance limit, namely, about 20,000 to 23,000 lbs. per square inch and while higher than copper, is not as high as I prefer to use. Cold drawn steel having a carbon content of from 0.20 upwards gives a much longer life if worked at a fiber stress below the endurance limit. A cold drawn material of 0.20 carbon would have an endurance limit of about 40,000 lbs. per sq. in. and one having about 1.20 carbon would have an endurance limit of about 50,000 lbs. per sq. in.

The cold working of steel increases greatly its elastic strength and also increases the tensile strength and fatigue strength. A given composition of steel may have its physical properties varied greatly by varying the treatment it is subjected to in fabrication, especially during the drawing into wire.

Cold drawn material is more or less flexible but resistant to bending and this increases as the carbon content increases and with the treatment the material is subjected to in producing a finished product and a bond body composed of a plurality of wires of 0.65 carbon is flexible but quite resistant to forming and especially to taking a "set" and therefore while the bond may be factory formed, this is not always done and when not formed at the factory, I employ a special tool for forming the bond at the time of installing and holding it against the rail surface during the welding operation (see Figs. 3 and 4).

The forming and holding tool comprises a body member 9 which overhangs the rail and a portion 10 provided with projections 11 spaced apart and so alined that the body 1 can be positioned between the projections 11 and thereby held in a formed shape until finally welded to the rail, and the body will thereafter maintain its formed position having a looped shaped portion at the center. This loop portion is essential in that it adds to the flexibility of the bond body and permits relative longitudinal movement of the rails.

It will be noted that if the bond body tends to maintain or assume a straight line position as shown in Fig. 1 due to its resistance to bending, that the members 11 will resist return movement of the cable to a straight form. The forming tool has a projection 12 which rests upon the upper surface of the rail 13 and is also provided with a weighted portion 14, which, to a considerable extent, balances the tool against the combined weight of the portion 10 and the bond. Therefore, it is merely necessary after positioning the bond between the lugs 11 to place the tool upon the rail with the terminals 2 against the side surface of the rail and the overbalanced weight of the bond and portion 10 will cause the terminals to maintain and contact with the rail until welded in position.

In welding, a heating flame of the electric arc or oxy-acetylene burner may be used, with which those skilled in the art are familiar and either a ferrous welding metal or a non-ferrous metal, such as copper or bronze, may be used. Phosphor-copper and silicon-copper give very good results. When the arc method is used with a metallic electrode in place of a carbon electrode, the parts are fused by the electric arc and the molten electrode is deposited on the terminal member and end of the body member and against the rail surface, thus uniting each to the other by the metal from the electrode.

I have made bonds of a cable composed of seven strands of nineteen wires each of cold drawn steel 0.023" diameter and 0.65 carbon and subjected the same to a vibration test consisting of moving the terminals relative to each other through an amplitude of 3/8". In such manner as to place a bending stress upon the cable, the same as in actual use, and the same withstood 20,000,000 cycles of movement of each terminal without breakage of a single wire. The same test made upon a like bond except having a copper body of 37 wires showed an ultimate life of about 1,000,000 cycles, at the end of which all 37 wires were broken. The above steel has a high modulus of elasticity compared to that of copper. By making the diameter of each wire small, the fiber stress in such wires is kept to a small value as compared with wires of larger diameter.

An advantage in using a ferrous material for the body of a bond to be welded to a rail by the arc or gas flame is that the steel does not absorb gases and deteriorate structurally, but copper absorbs gases very readily, called "gassing", during the welding operation and is materially effected and its life decreased thereby. When the body is composed of a copper core surrounded by steel strands, the copper is protected from "gassing".

Steel or iron does not conduct heat to the extent of copper, therefore the heat of welding a ferrous body is confined within closer limits to the end of the body than that of copper, hence I find that the endurance limit of the body is little affected by the welding. If I use an alloy steel such as a carbon steel containing chromium, nickel, vanadium, etc., the heat in welding has a still less effect upon the endurance limit.

Stainless iron or steel which is a steel containing from .1 to 1 carbon with about 15% chromium, if used, would produce a bond having a non-corroding property and a high endurance limit. Curve D records S. N. results on stainless iron containing about 0.09 carbon and 13.2 chromium. If the sample tested had high carbon and cold drawn, its fatigue limit would have exceeded about 49,000 lbs. per square inch.

The body could well be made of carbon steels having from 0.1 carbon upward and preferably cold worked and having a tensile strength per square inch of about 80,000 pounds and upward, or of carbon steel alloyed with manganese, tungsten, molybdenum, etc., and known as alloy steel.

The central strand 7 can have substituted a fibrous core, such as hemp if desired, in place of the metal core and such core impregnated with an oil or grease if desired, but it increases the resistance of the body for a given size.

There are modifications which will suggest themselves to those skilled in the art, therefore I do not wish to be limited by my claims. I claim:—

1. A rail bond comprising a pair of elongated tubular terminal members having means to catch and support welding metal and a flexible cable connecting the same, the cable comprising a plurality of preformed wires having an endurance limit not less than 41,000 pounds per square inch.

2. A rail bond comprising a pair of elongated tubular spaced terminal members and a resilient cable connecting the same, the cable comprising a central strand of copper with a plurality of preformed strands spirally wound about the central strand, each outer strand composed of a plurality of cold drawn wires of high-carbon steel harder than the terminals, each terminal compressed onto the cables and having its cable contacting surface compressed into the voids between the wires and strands of the cable.

3. A rail bond to be welded to a rail comprising a pair of terminals of ferrous metal connected by a cable, each terminal having a tubular portion secured to an end of the cable by compression and a projecting portion from the first portion to catch and retain welding metal in molten condition fused to the rail surface and the terminal and the end face of the cable, the cable comprising a plurality of preformed strands of steel wires and a strand of copper wires and a sleeve of relative thin non-ferrous metal interposed between the tubular portion and the cable through compression of the tubular portion of the terminal and embedded between the voids of the outer wires of the cable.

4. A rail bond having terminals connected by a plurality of parallel strands having a central strand of less endurance limit than the other strands, the said other strands spiralled about the central strand and each strand composed of preformed steel wires having a permanent set to relieve the stress therein and each terminal having a tubular portion surrounding the end portions of the strands, the terminals also having a portion adapted to receive molten metal to weld the terminals to rails.

5. A rail bond comprising a cable having a central strand of 19 wires and a plurality of strands of 19 wires each surrounding the central strand and having an endurance limit greater than that of the central strand and preformed and terminal members of steel compressed on the ends of the cable, a sleeve of relatively softer metal than that of the terminals and cable interposed between each terminal and cable and compressed by the terminal into the voids between the wires and strands on the surface of the cable.

6. A rail bond comprising a pair of spaced elongated terminals of soft steel having a common longitudinal axis connected by a cable and tightly compressed therein, the cable composed of a central strand of 19 wires of non-ferrous metal surrounded by 6 strands of 19 wires each, of high carbon steel, the diameter of the wires not exceeding 0.023 inches and a sleeve of softer metal than the terminal interposed between the cable and terminal into the voids between the wires of the adjacent cable surface.

7. A rail bond comprising a pair of elongated terminals connected by a cable composed of not less than 133 ferrous wires having a combined carbon content of not less than 0.1 and an endurance limit of not less than 30,000 pounds per square inch, each terminal having a straight outer surface in a longitudinal direction with a portion compressed onto the cable end and a portion projecting beyond the end of the cable with a part of the projecting portion cut away to form a shelf with tapering sides to catch and retain the molten welding metal in contact with the cable end.

8. A rail bond comprising a pair of spaced elongated tubular terminals of copper having a common longitudinal axis connected by a cable composed of a central strand of 19 wires and about which are laid 6 preformed strands of 19 wires each of high-carbon steel having an endurance limit of not less than 30,000 pounds per square inch, the terminals being secured to the cable by compression and the inner surface of the terminals interlocking with that of the cable and filling the voids therein.

9. A rail bond comprising a cable composed of a plurality of strands of preformed wires of steel having not less than 0.2% chemically combined carbon and a tubular-shaped terminal of softer metal compressed on each end of the cable and compressed onto the cable and a sleeve of still softer metal interposed between the terminal and cable and pressed into the voids between the wires on the cable surface through the compression of the terminals.

10. A rail bond comprising a cable composed of a plurality of strands of preformed wires of steel having not less than 0.2% chemically combined carbon and a tubular-shaped terminal of softer metal compressed on each end of the cable and compressed onto the cable and pressed into the voids between the wires on the cable surface through the compression of the terminals.

11. A rail bond comprising a pair of terminals connected to the ends of a cable formed of a plurality of cold drawn steel wires having an endurance limit of 41,000 pounds per square inch and substantially an indefinite life when the fibre stress to which the wires are subjected in use is less than 41,000 pounds per square inch.

12. A rail bond comprising a pair of terminals connected to the ends of a cable formed of a plurality of steel wires having substantially an indefinite life under flexing when subjected to a fibre stress of not to excess 41,000 pounds per square inch.

13. A rail bond comprising a pair of terminals connected to the ends of a cable formed of a plurality of preformed steel wires having substantially an indefinite life under flexing when subjected to a fibre stress of not to exceed 41,000 pounds per square inch.

14. The method of electrically connecting the adjacent ends of two rails movable relatively to each other comprising welding to the surface of the adjacent ends of two rails the ends of a flexible cable having an endurance limit greater than the fibre stress to which the cable will be subjected under movement of the rail ends.

15. The combination of a pair of rails having adjacent ends, a flexible cable comprising a plurality of steel wires of sufficient length to span the joint between the rail ends and placed adjacent the side faces of the rails, the cable having an endurance limit in excess of the fibre stress to which it will be subjected through relative movement of the rails, terminals secured to the ends of the cable and welding metal fused to each end of the cable, to its terminal and to the rail to unite the adjacent rail, terminal and cable together.

In testimony whereof I affix my signature.
PLINY P. PIPES.